Patented July 28, 1925.

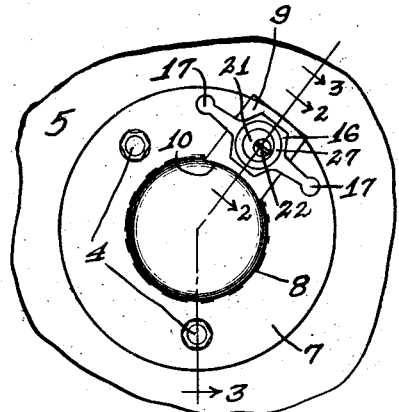

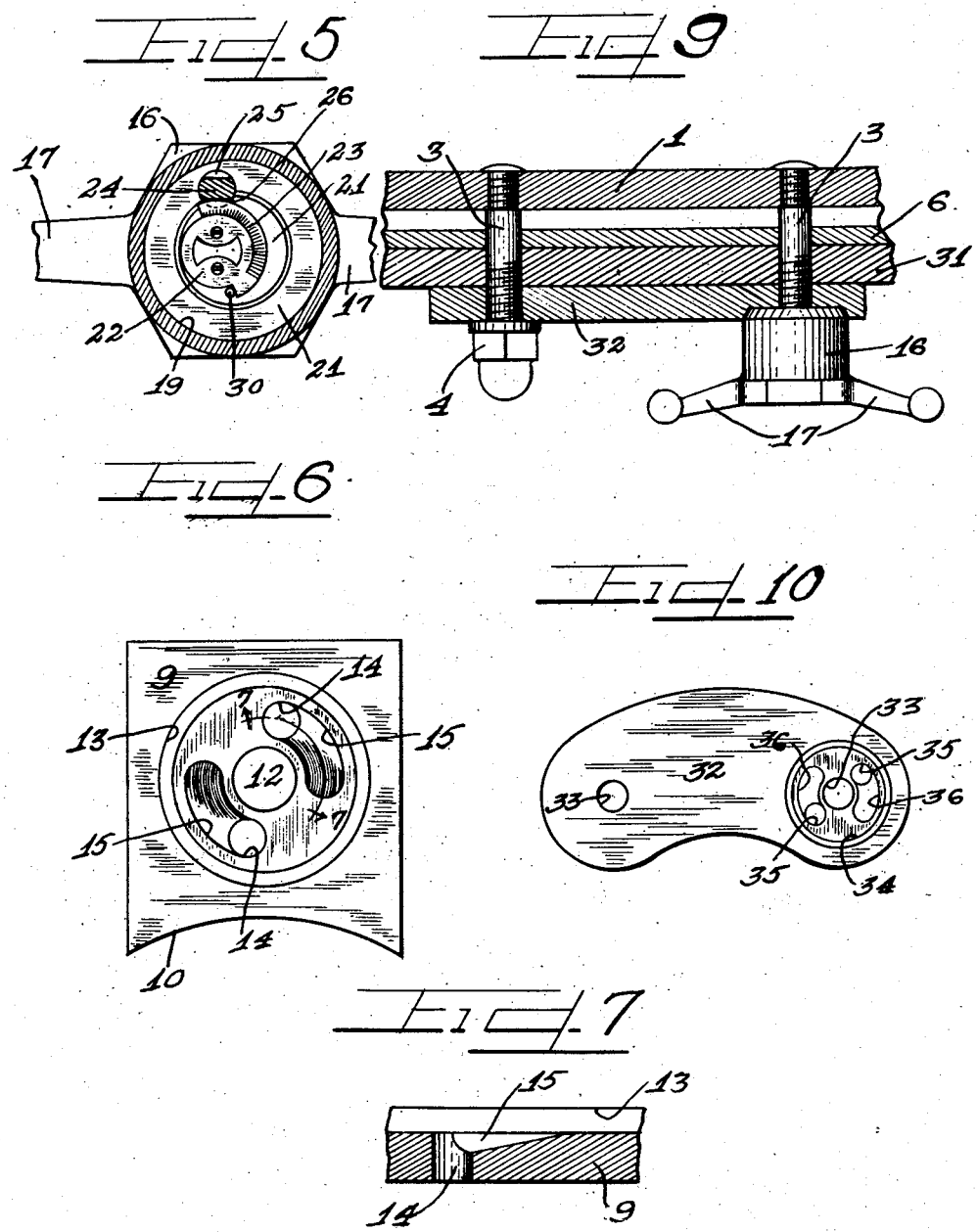

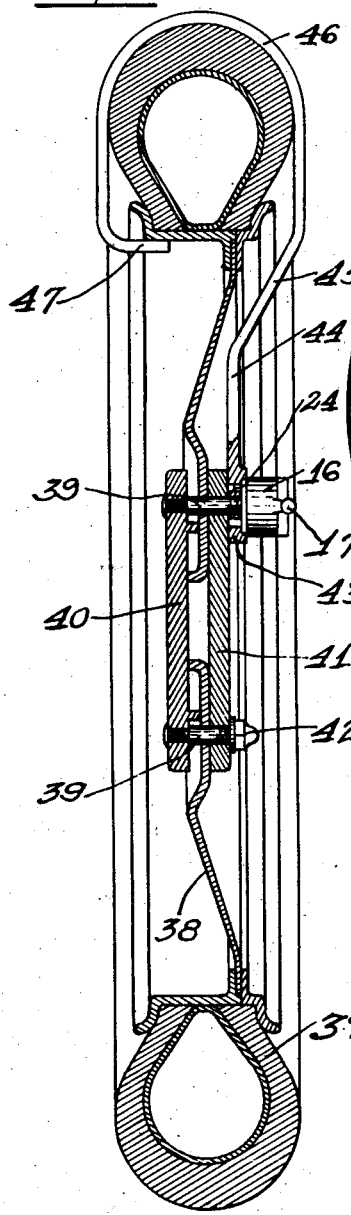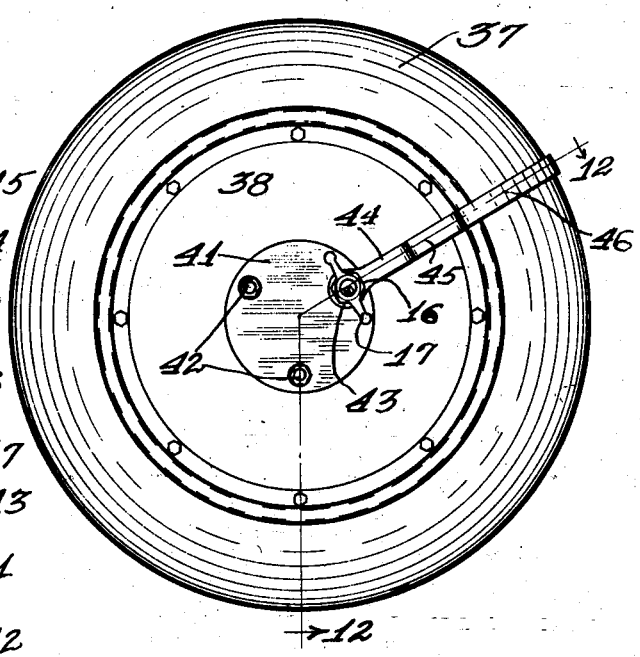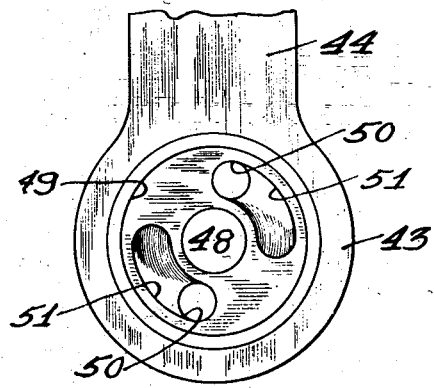

1,547,653

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

DISK-WHEEL-CARRIER LOCK.

Application filed March 29, 1922. Serial No. 547,633.

*To all whom it may concern:*

Be it known that I, COLVIN L. JOHNSON, a citizen of the United States, and a resident of the city of St. Louis, in the county of St. Louis and State of Missouri, have invented certain new and useful Improvements in a Disk-Wheel-Carrier Lock; and I do hereby declare that the following is a full, clear, and exact description of the same, reference being had to the accompanying drawings, and to the numerals of reference marked thereon, which form a part of this specification.

This invention relates more particularly to an improved type of a lock for securing a spare disk wheel on a wheel carrier of an automobile against unauthorized removal.

It is an object of this invention to provide an improved disk wheel lock for locking a spare disk wheel on a carrier.

It is also an object of the invention to provide one of the mounting bolts of a vehicle spare wheel carrier with a locking nut.

Another object of the invention is to replace one of the retaining nuts of a spare wheel carrier by a washer and locking nut adapted to be released by releasing a latch in the locking nut by means of a key.

It is a further object of the invention to provide a key releasable lock nut, a grooved washer and a retaining plate adapted to be substituted for one of the nuts of a spare wheel carrier to be locked in place on the carrier against removal except by means of a proper key.

It is an important object of this invention to provide a simple and effective lock nut whereby a spare disk wheel may be locked upon a carrier by simply substituting the lock nut and a non-rotatable washer member for one of the carrier nuts.

Other and further important objects of this invention will be apparent from the disclosures in the specification and drawings.

The invention (in a preferred form) is illustrated in the drawings and hereinafter more fully described.

On the drawings:

Figure 1 is a front view of the disk wheel carrier lock embodying the principles of this invention and shown in locking position on a carrier plate.

Figure 2 is an enlarged detail section taken on line 2—2 of Figure 1, with parts in elevation.

Figure 3 is an enlarged detail section taken on line 3—3 of Figure 1, showing the lock nut in elevation.

Figure 4 is a front view of the lock nut.

Figure 5 is a fragmentary section taken on line 5—5 of Figure 2.

Figure 6 is a view of the washer plate taken on line 6—6 of Figure 2.

Figure 7 is a fragmentary detail section taken on line 7—7 of Figure 6.

Figure 8 is a view similar to Figure 1 disclosing a modified form of washer plate.

Figure 9 is an enlarged fragmentary detail section taken on line 9—9 of Figure 8, showing the nuts in elevation.

Figure 10 is a plan view of the modified washer plate.

Figure 11 is a side elevation of a disk wheel and carrier equipped with another modified form of lock nut mechanism.

Figure 12 is an enlarged diametrical section taken on line 12—12 of Figure 11.

Figure 13 is an enlarged fragmentary view of the washer member with which the lock nut coacts.

As shown on the drawings:

The reference numeral 1 indicates a vehicle carrier plate provided with an outwardly projecting bead or flange ring 2. The carrier plate 1 may be secured to a vehicle by any suitable means and has rigidly secured at right angles thereto outwardly projecting parallel screw bolts 3 adapted to receive cap nuts 4 removably engaged on the outer ends thereof. Reference numeral 5 indicates the disk of a vehicle spare disk wheel having a plurality of apertures therein positioned to permit the disk to be projected onto the carrier bolts 3, as illustrated in Figure 3, and in contact with the flange 2. The inner peripheral margin of the wheel disk 5 is bent to form a flange 6 which seats against the carrier plate 1 to the inside of the carrier plate flange 2.

Engaged upon the carrier bolts 3 to the outside of the wheel disk 5 is an apertured retaining plate 7 having a circular groove 8 in the outer surface thereof. To secure the retaining plate 7 firmly against the middle portion of the wheel disk 5 the cap nuts 4 are threaded onto the projecting ends of the bolts 3.

To lock the spare disk wheel on the carrier to prevent stealing thereof, one of the cap nuts 4 is removed and replaced by a locking washer and nut. The locking washer comprises a plate 9 having three straight edges and an inwardly curved or concave edge 10. Integrally formed on the curved edge 10 of the washer plate 9 is a segment-shaped lip or flange 11. An opening 12 is provided in the washer plate 9 to permit the same to be engaged on a carrier bolt 3 with the flange 11 seated in the groove 8 of the retaining plate 7. The washer plate 9 is provided with a circular recess 13 in the outer face thereof. As illustrated in Figures 6 and 7, the washer plate 9 has two diametrically opposite openings 14 in the bottom of the recess 13 thereof on opposite sides of the opening 12. The inner face of the washer plate recess is also provided with two oppositely disposed inclined arc shaped slots or grooves 15 having the deepest portions thereof at the openings 14, while the other ends are flush with the inner face of the recess bottom, as shown in Figure 7.

The lock nut comprises a nut portion or casing 16 provided with oppositely directed integral handles 17. Formed within the nut 16 is an axial threaded passage 18, a recess or chamber 19, and a locking bolt passage 20. Mounted within the nut chamber 19 within a collar 27 is a key operated barrel lock 21 having a rotatable barrel 22 provided with a key slot. Secured to the inner end of the lock barrel is a cam strip or segment 23. Slidably engaged in the nut passage 20 is a locking bolt or latch 24 having notches 25 and 26 in opposite sides thereof. The cam 23 engages in the locking bolt notch 26 to permit actuation of said bolt. The bolt 24 projects into a passage 28 in the lock nut and in the collar 27, as illustrated in Figure 2. Seated in the passage 28 is a coiled spring 29, the inner end of which engages in a recess formed in the inner end of the latch bolt 24. The spring 29 acts to hold the latch bolt 24 projected and the cam 23 serves to limit the movement of said latch bolt 24. A stop pin 30 is provided on the inner end of the key lock 21 to limit the rotation of the lock barrel to keep the cam 23 from becoming disengaged from the latch bolt 24.

In the modified form of the device illustrated in Figures 8, 9 and 10 the construction is substantially the same as that already described with the exception that the retaining plate 7 is replaced by a retaining plate 31 having five apertures therein instead of three. In this case the washer plate 9 is replaced by a long segment-shaped washer plate 32 having two openings 33 therein near the ends thereof to permit the washer plate to be engaged on two of the carrier bolts 3 to prevent rotation of said washer plate. The washer plate 32 is also provided with a recess 34 and with two diametrically opposite openings 35 and inclined grooves 36. One of the carrier bolts 3 on which the washer plate 32 is engaged has a nut 4 engaged thereon, while the other bolt 3 has the lock nut 16 engaged thereon to lock a spare wheel in place on a carrier.

Figures 11, 12 and 13 illustrate another modified form of the device wherein the construction of the lock nut 16 is the same as that illustrated in Figures 2 and 4. In this form of the device the reference numeral 37 indicates a vehicle wheel having a disk 38 provided with apertures to permit the wheel to be engaged on bolts 39 of a carrier plate 40. Engaged on the carrier bolts 39 to the outside of the wheel disk 38 is an apertured retaining plate 41. For the purpose of holding the retaining plate 41 firmly against the middle portion of the wheel disk 38 cup nuts 42 are threaded onto the projecting ends of the bolts 39.

To lock the spare disk wheel on the carrier to prevent stealing thereof, one of the cup nuts 42 is removed and is replaced by a washer member and lock nut 16. The washer member in this instance comprises a washer plate 43 having integrally formed thereon a radially directed arm 44 deflected at 45 and having the outer end thereof bent to afford a resilient loop 46 adapted to be engaged around the tire of the wheel. The end of the loop 46 is bent inwardly to form a hook 47 adapted to engage the inner periphery of the wheel rim, as clearly illustrated in Figure 12. The hooked arm member is provided for the purpose of holding the washer plate 43 against rotation on the carrier bolt.

An opening 48 is provided centrally in the inner plate 43 to permit the same to be engaged on one of the carrier bolts 39 adjacent the outer surface of the carrier retaining plate 41. The washer plate 43 is also provided with a circular recess 49 in the outer face thereof and with two diametrically opposite openings 50. The washer plate 43 is also provided with two oppositely disposed inclined arc shaped slots or grooves 51 having the deepest portions thereof at the openings 50 while the other ends are flush with the inner surface of the recess bottom.

The operation is as follows:

To lock the spare disk wheel in place upon an automobile spare wheel carrier 1, the apertured disk 6 of the spare wheel is engaged on the carrier bolts 3 after which the retaining plate 7 is also engaged on said bolts to the outside of the disk and adjacent thereto with the groove 8 to the outside. Two of the nuts 4 are threaded upon two of the carrier bolts 3.

The washer plate 9 is now engaged on the remaining carrier bolt 3 with the curved flange 11 thereof seated in the groove 8 of the retaining plate 7 to hold the washer plate against rotation. The lock nut 16 is next threaded upon the projecting end of the last carrier bolt 3. As the lock nut 16 is rotated by means of the handles 17, the projecting latch bolt 24 tracks in the retaining plate inclined grooves 15 in a clockwise direction looking at Figure 6, thereby permitting the control spring 29 to project the latch bolt 24 into an opening 14, after which the bolt passes out of the opening by way of the inclined groove 15 thereby compressing the spring 29. The sliding movement of the latch bolt is limited by the length of the notch 26 into which the lock cam 23 projects. The lock nut 16 is thus threaded into place until the retaining plate 7 forces the wheel tightly against the carrier plate 1, as shown in Figure 3. The spare wheel is thus securely locked on the carrier against unauthorized removal even though the retaining nuts 4 are removed from the remaining carrier bolts 3.

The lock nut 16 cannot be removed by rotating the same on a carrier bolt in a counter-clockwise direction since the spring 29 holds the latch bolt 24 projected so that when it seats in one of the retaining plate openings 14 it holds the lock nut locked against further rotation. The lock nut can therefore not be removed.

To remove a spare disk wheel from the carrier it is necessary to insert a key into the key slot of the lock barrel 22 to rotate the barrel. Rotation of the lock barrel 22 causes rotation of the cam 23. As the cam is partially rotated it acts in the latch bolt notch 26 and causes the latch bolt 24 to be retracted against the action of the control spring 29. With the latch bolt 24 retracted the lock nut 16 may be rotated by means of the handles 17 in a counter-clockwise direction until it is removed from the carrier bolt. The washer plate 9 is now removed, after which the retaining nuts 4 may also be removed. The retaining plate 7 and the spare disk wheel may now be removed from the spare wheel carrier.

The operation of the modified form of the device illustrated in Figures 8, 9 and 10 is the same as that hereinbefore described. In this form the washer plate 32 is prevented from being rotated by engaging the same on two of the carrier bolts 3 instead of on one as shown in Figure 1 when the washer plate 9 is used.

The operation of the modified construction illustrated in Figures 11, 12 and 13 is substantially the same as that hereinbefore described. In this case the washer plate 43 is prevented from turning by the looped arm 44, the looped end 46 of which is engaged around the tire and rim of the wheel.

I am aware that numerous details of construction may be varied through a wide range without departing from the principles of this invention, and I therefore do not purpose limiting the patent granted otherwise than necessitated by the prior art.

I claim as my invention:

1. The combination with a carrier bolt, of a grooved apertured washer engaged thereon, means for holding the washer against rotation, a lock nut adapted to be threaded onto said bolt, a locking member in said nut having resilient engagement with said washer to permit the lock nut to be rotated in one direction only, and a key lock operated cam in said lock nut adapted to retract said locking member to permit the lock nut to be rotated in an opposite direction.

2. The combination with a carrier bolt, of a washer plate engaged thereon and having an aperture, and an inclined groove therein, means for holding the washer plate stationary, a lock nut adapted to be threaded upon said carrier bolt, a pin lock mounted in said lock nut, a cam member secured to the key operated barrel of the pin lock, a notched latch in said lock nut, and a spring in said lock nut for holding said latch projected to permit the travel over the washer plate in a direction from the aperture to the groove when the lock nut is threaded onto the carrier bolt, said aperture adapted to receive the latch and hold the lock nut locked on the carrier bolt when the locked nut is rotated in a reverse direction.

3. A spare wheel carrier lock comprising a stationary bolt, a washer engaged thereon having an aperture and a groove therein communicating with one another, means for holding the washer stationary, a nut adapted to be threaded onto the bolt to seat in said washer, a notched spring-impelled latch in said nut adapted to engage said washer to permit rotation of the nut in one direction only, a barrel lock in said nut, and a member in said nut engaging said notched latch and adapted to be actuated when the barrel lock is operated to retract the latch to permit the lock nut to be rotated in a reverse direction off of said bolt.

4. The combination with a bolt and a washer thereon, of a lock nut on the bolt, a key lock in said nut, and cam-controlled means operable thereby adapted to engage the washer to permit rotation of the lock nut in one direction only.

5. A spare wheel lock device comprising a bolt, a washer thereon having an opening and an inclined groove therein, a nut adapted to be threaded onto said bolt, handles on said nut for turning the same, a spring-controlled latch in said nut adapted to engage in said washer aperture to hold the nut locked against rotation in one direction, said inclined groove communicating with the aperture to permit rotation of the nut in an opposite direction on said bolt, a key lock in said nut, and a cam member operable thereby adapted to retract the latch to permit the nut to be removed from the bolt.

6. The combination with a stationary washer, of a stationary bolt projecting therethrough, a nut adapted to be engaged on said bolt, latch means in said bolt having resilient contact with said washer adapted to hold said nut locked against rotation on said bolt in one direction, cam means in said nut adapted to limit the movement of said latch means, and means for actuating said cam means to cause the same to retract the latch means to permit rotation of the nut in the opposite direction on said bolt.

7. The combination with a bolt, of a washer thereon, a lock nut engaged on said bolt, a key lock in said nut, a latch in said nut adapted to engage said washer, and cam means operable by said lock in said nut for actuating the latch.

8. The combination with a spare wheel carrier, and threaded bolts thereon adapted to fit into the hub holes in a spare wheel disk, of threaded means adapted to engage one of said bolts to retain the wheel disk thereon, and key-operated means for locking said threaded means in its retaining position.

In testimony whereof I have hereunto subscribed my name.

COLVIN L. JOHNSON.